United States Patent
Shimizu et al.

(10) Patent No.: US 8,277,856 B2
(45) Date of Patent: Oct. 2, 2012

(54) METHOD OF PRODUCING ACIDIC LACTIC ACID BACTERIA BEVERAGE

(75) Inventors: Kanetada Shimizu, Zama (JP); Kazuya Murakami, Ebina (JP); Sachiko Takahashi, Tokyo (JP); Yuta Hirano, Sagamihara (JP); Tatsuya Itou, Zama (JP); Naoki Susaki, Konan (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 249 days.

(21) Appl. No.: 12/600,096

(22) PCT Filed: Mar. 11, 2009

(86) PCT No.: PCT/JP2009/054649
§ 371 (c)(1),
(2), (4) Date: Nov. 13, 2009

(87) PCT Pub. No.: WO2009/119315
PCT Pub. Date: Oct. 1, 2009

(65) Prior Publication Data
US 2010/0247711 A1  Sep. 30, 2010

(30) Foreign Application Priority Data
Mar. 27, 2008 (JP) ................... 2008-082285

(51) Int. Cl.
*A23C 9/12* (2006.01)
(52) U.S. Cl. .............. 426/43; 426/34; 426/42; 426/590; 426/658
(58) Field of Classification Search ............... 426/34, 426/42, 43, 590, 658
See application file for complete search history.

(56) References Cited

FOREIGN PATENT DOCUMENTS

| JP | 60-164432 | 8/1985 |
|---|---|---|
| JP | 2003-522784 | 7/2003 |
| WO | 01/60346 A2 | 8/2001 |
| WO | 2005-110107 A1 | 11/2005 |
| WO | 2007039596 A1 | 4/2007 |
| WO | 2007125558 A1 | 11/2007 |

OTHER PUBLICATIONS

Tarek El-Nemr et al., Influence of Jerusalem Artichoke Inuline Addition as a Prebiotic on Bifidobacteria Survival in Egyptian Flavored Fermented Rayeb Drink, Deutsche Lebensmittel-Rundschau (2007), vol. 103, No. 2, p. 65-71.
Ulla Sairanen et al., The Effect of probiotic fermented milk and inulin on the functions and microecology of the intestine, Journal of Dairy Research (2007), vol. 74, No. 3, p. 367-373.
Jisedai Gata Cho Kinosei Yoghurt 'Sym Balance' Hatsubai, Japan Food Journal (May 22, 1996), p. 6.
T. Vasiljevic et al., Effects of β- Glucan Addition to a Probiotic Containing Yogurt, Journal of Food Science (2007), vol. 72, No. 7, p. C405-C411.
Japanese Patent Office, Search Report and Written Opinion in International Patent Application No. PCT/JP2009/054649 dated May 12, 2009.
Extended European Search Report in PCT application No. PCT/JP2009054649, mailed Mar. 10, 2011.

*Primary Examiner* — Leslie Wong
(74) *Attorney, Agent, or Firm* — Wood, Herron & Evans, LLP

(57) ABSTRACT

An acidic lactic acid bacteria beverage having a favorable flavor and an improved survival rate for bifidobacteria. The acidic lactic acid bacteria beverage of the present invention includes bifidobacteria and inulin, wherein the inulin is not fermented by the bifidobacteria. The inulin content is preferably within a range from 1 to 10% by mass, and the pH of the acidic lactic acid bacteria beverage is preferably within a range from 4.1 to 4.8.

3 Claims, No Drawings

METHOD OF PRODUCING ACIDIC LACTIC ACID BACTERIA BEVERAGE

BACKGROUND OF THE INVENTION

1. Field of the Invention

The present invention relates to an acidic lactic acid bacteria beverage and a method of producing the acidic lactic acid bacteria beverage. In particular, the invention relates to an acidic lactic acid bacteria beverage having a favorable flavor and excellent survival of bifidobacteria during storage, as well as a method of producing such an acidic lactic acid bacteria beverage.

Priority is claimed on Japanese Patent Application No. 2008-82285, filed Mar. 27, 2008, the content of which is incorporated herein by reference.

2. Description of Related Art

Bifidobacteria are bacteria that grow in the large intestine of humans and exhibit physiologically advantageous effects such as inhibiting pathogenic bacteria and regulating the intestinal functions, and because they perform an important role in maintaining people's health, the use of bifidobacteria in all manner of food products is widespread. In particular, acidic lactic acid bacteria beverages that include bifidobacteria cultures containing mainly milk as the culture medium provide a high nutritional value and are very popular.

However, bifidobacteria have different bacterial properties from typical lactic acid bacteria in that (1) they are obligate anaerobic bacteria that do not grow in environments where oxygen exists, and (2) they have low acid resistance. Accordingly, long-term storage within low pH environments such as within fermented milk or lactic acid bacteria beverages is difficult, and maintaining a high live bacterial count of bifidobacteria within such beverages is problematic.

Accordingly, tests have been conducted in which dietary fiber is added to improve the storage properties of the bifidobacteria. Patent Document 1 discloses that by adding bifidobacteria to a raw milk solution containing added insoluble dietary fiber and then cultivating the bifidobacteria, the survival rate for the bifidobacteria upon storage at 5° C. for 10 days is superior to that obtained when no insoluble dietary fiber is added.

Further, Patent Document 2 discloses that adding a decomposition product of the water-soluble dietary fiber galactomannan prior to fermentation promotes the growth of the bifidobacteria and also improves the storage and survival properties of the resulting fermented milk (see Patent Document 2). Patent Document 2 discloses that no effects were observed when the galactomannan decomposition product was added after fermentation, with the effects only achieved when addition was performed prior to fermentation. Furthermore, these effects were limited to galactomannan decomposition products, and the document discloses that no effects were obtained when inulin or indigestible dextrin were added prior to fermentation.

[Patent Document 1]
Japanese Unexamined Patent Application, First Publication No. Sho 60-164432
[Patent Document 2]
International Publication No. WO 05/110107

SUMMARY OF THE INVENTION

However, lactic acid bacteria beverages must normally be able to be stored for 2 weeks or longer at 10° C. Accordingly, the improvement in survival rate for bifidobacteria upon storage at 5° C. for 10 days obtained in Patent Document 1 is far from being totally satisfactory. Furthermore, the use of insoluble dietary fiber is also problematic, as it imparts a rough gritty feeling to the product.

Furthermore, in a method such as that disclosed in Patent Document 2, where a galactomannan decomposition product is added prior to fermentation, because the fermentation of the bifidobacteria must be conducted in the presence of the galactomannan decomposition product, a separate fermentation step is an absolute necessity. As a result, large-scale facilities including a fermentation tank are required, meaning the method is not suited to production methods for lactic acid bacteria beverages that do not require a fermentation step, such as methods in which frozen or powdered bifidobacteria is added to an acidic milk.

The present invention takes the above circumstances into consideration, with an object of providing an acidic lactic acid bacteria beverage having a favorable flavor and an improved survival rate for bifidobacteria.

In order to achieve the above object, the present invention adopts the aspects described below.

[1] An acidic lactic acid bacteria beverage including bifidobacteria and inulin, wherein the inulin is not fermented by the bifidobacteria.

[2] An acidic lactic acid bacteria beverage according to [1] above, wherein an amount of the inulin is within a range from 1 to 10% by mass.

[3] An acidic lactic acid bacteria beverage according to [1] or [2] above, having a pH within a range from 4.1 to 4.8.

[4] An acidic lactic acid bacteria beverage according to any one of [1] to [3] above, wherein the bifidobacteria is *Bifidobacterium longum*.

[5] A method of producing an acidic lactic acid bacteria beverage, including adding a culture containing bifidobacteria to a sterilized base, which includes a raw milk and inulin and has been subjected to emulsification and sterilization.

The acidic lactic acid bacteria beverage of the present invention has a favorable flavor and exhibits an improved survival rate for the bifidobacteria. Further, the method of producing an acidic lactic acid bacteria beverage according to the present invention enables an acidic lactic acid bacteria beverage having a favorable flavor and an improved survival rate for the bifidobacteria to be obtained.

A detailed description of preferred embodiments of the present invention is presented below. However, the present invention is in no way limited by the preferred embodiments described below, and may be freely modified within the scope of the present invention.

[Acidic Lactic Acid Bacteria Beverage]

An acidic lactic acid bacteria beverage of the present invention contains bifidobacteria and inulin. Further, being an acidic lactic acid bacteria beverage, the beverage also includes a milk.

Examples of the raw milk for the above milk include cows' milk, non-fat milk, concentrated products thereof, and reconstituted non-fat milk. The milk includes not only the raw milk, but also fermented products of the raw milk.

As an ideal bifidobacterium for the present invention, *Bifidobacterium longum* is preferred. Specific examples of the *Bifidobacterium longum* include the *Bifidobacterium longum* strains ATCC15707 and ATCC BAA-999. Examples of bifidobacteria other than *Bifidobacterium longum* include *Bifidobacterium infantis* ATCC15697 and *Bifidobacterium bifidum* ATCC15696.

The acidic lactic acid bacteria beverage of the present invention preferably contains a lactic acid bacteria that satisfies the conditions for "lactic acid bacteria beverages" prescribed in the ministerial ordinance (the Ministerial Ordinance concerning Compositional Standards, etc. for Milk and Milk Products). In order to qualify as a lactic acid bacteria beverage recognized by the ministerial ordinance, if the non-fat milk solid content is 3% by mass or higher, then the lactic acid bacterial count must be not less than 10,000,000 per 1 ml. Further, if the non-fat milk solid content is less than 3% by mass, then the lactic acid bacterial count must be not less than 1,000,000 per 1 ml.

The acidic lactic acid bacteria beverage of the present invention may include lactic acid bacteria besides the bifidobacteria. Examples of these lactic acid bacteria besides the bifidobacteria include *Streptococcus thermophilus* and *Lactobacillus bulgaricus*. Of these, *Streptococcus thermophilus* is preferred as it exhibits favorable compatibility with the bifidobacteria. Examples of ideal *Streptococcus thermophilus* for the present invention include the *Streptococcus thermophilus* strains ATCC19258 and FERM P-17216.

The acidic lactic acid bacteria beverage of the present invention may include yeast besides the lactic acid bacteria. Further, the acidic lactic acid bacteria beverage of the present invention may be an acidic beverage containing bifidobacteria and inulin, even if it doesn't include a lactic acid bacteria as prescribed in the Ministerial Ordinance concerning Compositional Standards, etc. for Milk and Milk Products.

The inulin used in the present invention is a polysaccharide containing 2 to 60 fructose units linked in a straight chain via β(2-1) bonds with a single glucose unit at one terminal. Known inulins include naturally derived compounds that exist in plants such as chicory root (such as the commercial product Raftiline ST chicory fiber, manufactured by BENEO-Orafti Inc.), as well as compounds synthesized from sugar (such as the commercial product Fuji FF, manufactured by Fuji Nihon Seito Corporation).

The inulin contained within the acidic lactic acid bacteria beverage of the present invention has not been fermented by the bifidobacteria. In other words, the inulin is not added until after the stage where the bifidobacteria starter culture or a fermented milk base containing the bifidobacteria undergoes fermentation, and once the bifidobacteria and the inulin have been mixed, the mixture is stored at a low temperature where fermentation (incubation) of the bifidobacteria does not occur.

The amount of inulin included within the acidic lactic acid bacteria beverage is preferably within a range from 1 to 10% by mass, and is more preferably from 2 to 5% by mass. Provided the amount of inulin is at least 1% by mass, a satisfactory improvement in bifidobacteria survival can be achieved, and provided the amount is not more than 10% by mass, the product can be imparted with a suitable degree of viscosity.

Inulin is water-soluble, and therefore causes no rough gritty feeling, meaning a favorable flavor can be retained for the acidic lactic acid bacteria beverage.

The pH of the acidic lactic acid bacteria beverage of the present invention is preferably within a range from 4.1 to 4.8, and is more preferably from 4.5 to 4.8. Provided the pH is at least 4.1, the storage and survival properties of the bifidobacteria can be readily maintained, whereas a pH of not more than 4.8 yields a satisfactory degree of tartness.

The acidic lactic acid bacteria beverage of the present invention may include an acid as a pH regulator. As this acid, any of the conventional acidulants or acidic foodstuffs used as food additives may be used. Specific examples of acidulants that may be added include citric acid, adipic acid, itaconic acid, glucono delta-lactone, gluconic acid, α-ketoglutaric acid, succinic acid, tartaric acid, lactic acid, glacial acetic acid, phytic acid, fumaric acid, malic acid, phosphoric acid, and sodium salts of the above acids. Specific examples of the above acidic foodstuffs include vinegar and fruit juice.

The acidic lactic acid bacteria beverage of the present invention may include a sweetener in order to obtain an appropriate level of sweetness. As the sweetener, sucrose may be used alone, or a combination of sucrose and a high-level sweetener may be used. Further, if required, oils, fats and/or flavors may also be added.

Provided the acidic lactic acid bacteria beverage of the present invention is recognized for use within drink and foodstuffs under the prescriptions for foodstuffs in the Food Sanitation Act and the like, then other additives may also be added to the beverage, provided the survival rate of the bifidobacteria is not impaired. For example, stabilizers such as carboxymethylcellulose (CMC), high methyl pectin and soybean dietary fiber, and colorants and the like may be added.

By including inulin, the acidic lactic acid bacteria beverage of the present invention is able to retain a favorable bacterial count for live bifidobacteria, even when the beverage is stored for a considerable period following production.

[Method of Producing Acidic Lactic Acid Bacteria Beverage]

The method of producing an acidic lactic acid bacteria beverage according to the present invention includes adding a culture containing bifidobacteria to a sterilized base, which contains a raw milk and inulin and has been subjected to emulsification and sterilization.

In order to obtain the sterilized base, a milk preparation containing a raw milk and inulin is preferably emulsified and subsequently sterilized. The milk preparation preferably contains all the raw materials besides the culture, including the raw milk and the inulin.

There are no particular limitations on the sequence in which the emulsification and the sterilization are performed, nor on the order in which the raw materials are mixed, provided the final base is emulsified and sterilized. For example, the raw milk and the inulin may be sterilized separately, and then mixed together and emulsified. Alternatively, a separately sterilized inulin may be added to a liquid obtained by emulsifying and sterilizing a mixture containing all of the raw materials besides the inulin and the culture.

When adding the culture containing the bifidobacteria, a culture containing other bacteria such as *Streptococcus thermophilus* may be added at the same time. These cultures can be obtained using conventional methods, by incubating a seed culture in a medium containing a milk.

Following addition of the culture(s), the beverage is stored at low temperature. The storage temperature is preferably not higher than 10° C., and is more preferably 5° C. or lower.

EXAMPLES

A series of test examples and examples are described below, although the present invention is in no way limited by the following examples.

In the following test examples and examples, the amounts reported for the dietary fiber such as inulin represent amounts within the sterilized base. However, because the amount of the culture added to the sterilized base is very small, the amount of the dietary fiber within the final test solution or lactic acid bacteria beverage is substantially equal to the amount of the dietary fiber within the sterilized base.

Further, the pH refers to the pH of the sterilized base, but because the amount of the culture added to the sterilized base is very small, the pH of the final test solution or lactic acid bacteria beverage is substantially equal to the pH of the sterilized base.

Test Example 1

Effect of Various Water-Soluble Dietary Fibers on Bifidobacteria Survival (Culture Preparation)

1,000 ml of a medium composed of a yeast extract 0.2% (w/w) and non-fat milk powder 11% (w/w) that had been subjected to sterilization at 90° C. for 30 minutes was inoculated with 100 ml of a seed culture of the *Bifidobacterium longum* strain ATCC BAA-999, and the mixture was incubated for 6 hours at 37° C., thus yielding a culture of the *Bifidobacterium longum* strain ATCC BAA-999.

Meanwhile, 1,500 ml of a medium composed of a yeast extract 0.1% (w/w) and a reconstituted non-fat milk medium 10% (w/w) that had been subjected to sterilization at 90° C. for 30 minutes was inoculated with 50 ml of a seed culture of the *Streptococcus thermophilus* strain ATCC19258, and the mixture was incubated for 5 hours at 37° C., thus yielding a culture of the *Streptococcus thermophilus* strain ATCC19258.

(Water-Soluble Dietary Fibers)

As the water-soluble dietary fibers, inulin (product name: Fuji FF, manufactured by Fuji Nihon Seito Corporation), indigestible dextrin (product name: Pine Fibre, manufactured by Matsutani Chemical Industry Co., Ltd.), and a galactomannan decomposition product (product name: Sunfiber R, manufactured by Taiyo Kagaku Co., Ltd.) were used.

(Preparation of Sterilized Base)

30 kg of a liquid milk preparation composed of non-fat milk powder 3.1% (w/w), one of the above water-soluble dietary fibers 3% (w/w), CMC 0.4% (w/w), citric acid (in sufficient amount to regulate the pH to 4.6) and flavor 0.1% (w/w), with the remainder being water, was emulsified and then subjected to heat sterilization, thus completing preparation of a sterilized base [milk fat: 0.1% (w/w), non-fat milk solid content: 2.9% (w/w)].

Specifically, the non-fat milk powder (manufactured by Morinaga Milk Industry Co., Ltd.), the dietary fiber and the CMC (manufactured by Dai-ichi Kogyo Seiyaku Co., Ltd.) were mixed and dissolved in the water. Following mixing, the citric acid (manufactured by San-Ei Gen F.F.I. Inc.) was added to adjust the pH to 4.6, and finally the flavor was added to complete production of the liquid milk preparation. The thus obtained liquid milk preparation was then emulsified by conducting a homogenization treatment at 15 MPa.

Subsequently, heat sterilization was performed. The heat sterilization was conducted under sterilization conditions that involved holding the preparation at 130° C. for 2 seconds using a plate-type sterilizer (manufactured by Morinaga Engineering Co., Ltd.). Following the heat sterilization, the temperature of the liquid was cooled to 10° C., yielding a sterilized base containing the dietary fiber.

(Preparation of Test Solutions)

To each of the sterilized bases were added a sufficient amount of the culture of the *Bifidobacterium longum* strain ATCC BAA-999 prepared in the manner described above to achieve a bacterial count following addition of approximately $1 \times 10^8$/ml, and a sufficient amount of the above culture of the *Streptococcus thermophilus* strain ATCC19258 to achieve a bacterial count following addition of approximately $2 \times 10^6$/ml, thus completing preparation of a series of test solutions.

(Storage Test)

After preparation, each test solution was stored for 2 weeks at 10° C. The bifidobacteria count was measured immediately following preparation, one week after preparation, and then two weeks after preparation. Measurement of the bifidobacteria count was conducted using a plate of a TOS propionate agar medium (manufactured by Yakult Pharmaceutical Industry Co., Ltd.). The measurement results are shown in Table 1. The survival rate values are reported as percentages relative to the bifidobacteria count immediately following preparation.

TABLE 1

| Dietary fiber | Immediately after preparation Live bacterial count (/ml) | After one week Live bacterial count (/ml) | After one week Survival rate | After two weeks Live bacterial count (/ml) | After two weeks Survival rate |
|---|---|---|---|---|---|
| None added | $1.2 \times 10^8$ | $1.3 \times 10^6$ | 1.1% | $5.0 \times 10^4$ | 0.0% |
| Inulin | $1.2 \times 10^8$ | $3.0 \times 10^7$ | 24.7% | $1.0 \times 10^7$ | 8.2% |
| Indigestible dextrin | $1.0 \times 10^8$ | $4.4 \times 10^6$ | 4.3% | $1.2 \times 10^5$ | 0.1% |
| Galactomannan decomposition product | $1.2 \times 10^8$ | $5.0 \times 10^5$ | 0.4% | Not detected | — |

From the results in Table 1 it is evident that when no dietary fiber was added, the bifidobacteria count fell to approximately 1% of the initial value after one week, and to approximately 1/1000th of the initial value after two weeks. When inulin was added, the bifidobacteria count was maintained at not less than 10,000,000 per 1 ml (a survival rate of more than 5%) even after storage for two weeks, indicating excellent survival properties. In contrast, when indigestible dextrin or the galactomannan decomposition product was added, no significant improvement was observed compared with the solution containing no added dietary fiber.

From the results in Table 1 it is clear that only inulin has the effect of improving the bifidobacteria survival rate.

Test 2

Effect of Inulin Content on Bifidobacteria Survival (Culture Preparation)

Cultures of the *Bifidobacterium longum* strain ATCC BAA-999 were prepared using the same method as that described for test 1. Further, with the exception of changing the seed culture, cultures of the *Bifidobacterium longum* strain ATCC15707 were also prepared using the same method.

Furthermore, cultures of the *Streptococcus thermophilus* strain ATCC19258 were also prepared using the same method as that described for test 1.

(Preparation of Sterilized Base)

With the exception of altering the 3% (w/w) of the water-soluble dietary fiber to inulin amounts of 0 to 10% (w/w), as listed in Table 2, sterilized bases were prepared using the same method as that described for test 1.

(Preparation of Test Solutions)

To each of the sterilized bases were added a sufficient amount of either the culture of the *Bifidobacterium longum* strain ATCC BAA-999 or the culture of the *Bifidobacterium longum* strain ATCC15707 prepared in the manner described above to achieve a bacterial count following addition of approximately $1 \times 10^8$/ml, and a sufficient amount of the above culture of the *Streptococcus thermopilus* strain ATTCC19258 to achieve a bacterial count following addition of approximately $2 \times 10^6$/ml, thus completing preparation of a series of test solutions.

(Storage Test)

After preparation, each test solution was stored for 2 weeks at 10° C. The bifidobacteria count was measured immediately following preparation, one week after preparation, and then two weeks after preparation. Measurement of the bifidobacteria count was conducted using a plate of a TOS propionate agar medium (manufactured by Yakult Pharmaceutical Industry Co., Ltd.). The measurement results are shown in Table 2. The survival rate values are reported as percentages relative to the bifidobacteria count immediately following preparation.

ties compared with the solution containing no added inulin, for which no live bacteria could be detected.

In particular, a survival rate of at least 5% was achieved for either of the bifidobacteria when 2 to 5% of inulin was added, which represents a dramatic improvement in the bifidobacteria survival properties.

Test 3

Effect of Inulin on Bifidobacteria Survival at Various pH Levels (Culture Preparation)

Cultures of the *Bifidobacterium longum* strain ATCC BAA-999 were prepared using the same method as that described for test 1.

Furthermore, cultures of the *Streptococcus thermophilus* strain ATCC19258 were also prepared using the same method as that described for test 1.

(Preparation of Sterilized Base)

With the exceptions of using only inulin as the water-soluble dietary fiber, and altering the amount of added citric acid to regulate the pH to one of pH 4.1, pH 4.5 or pH 4.8 as listed in Table 3, sterilized bases were prepared using the same method as that described for test 1.

(Preparation of Test Solutions)

To each of the sterilized bases were added a sufficient amount of the culture of the *Bifidobacterium longum* strain ATCC BAA-999 prepared in the manner described above to achieve a bacterial count following addition of approximately $1 \times 10^8$/ml, and a sufficient amount of the above culture of the *Streptococcus thermophilus* strain ATCC19258 to achieve a bacterial count following addition of approximately $2 \times 10^6$/ml, thus completing preparation of a series of test solutions.

(Storage Test)

After preparation, each test solution was stored for 2 weeks at 10° C. The bifidobacteria count was measured immediately following preparation, one week after preparation, and then two weeks after preparation. Measurement of the bifidobacteria count was conducted using a plate of a TOS propionate agar medium (manufactured by Yakult Pharmaceutical Industry Co., Ltd.). The measurement results are shown in Table 3. The survival rate values are reported as percentages relative to the bifidobacteria count immediately following preparation.

TABLE 2

| *Bifidobacterium longum* | Inulin Amount added | Immediately after preparation Live bacterial count (/ml) | After one week Live bacterial count (/ml) | After one week Survival rate | After two weeks Live bacterial count (/ml) | After two weeks Survival rate |
|---|---|---|---|---|---|---|
| ATCC BAA-999 | 0% | $1.2 \times 10^8$ | $1.3 \times 10^6$ | 1.1% | $5.0 \times 10^4$ | 0.0% |
|  | 1% | $1.1 \times 10^8$ | $2.2 \times 10^7$ | 19.5% | $2.0 \times 10^6$ | 1.8% |
|  | 2% | $1.2 \times 10^8$ | $3.0 \times 10^7$ | 25.7% | $6.8 \times 10^6$ | 5.9% |
|  | 3% | $1.2 \times 10^8$ | $3.0 \times 10^7$ | 24.7% | $1.0 \times 10^7$ | 8.2% |
|  | 4% | $1.4 \times 10^8$ | $2.8 \times 10^7$ | 19.9% | $1.0 \times 10^7$ | 7.4% |
|  | 5% | $1.1 \times 10^8$ | $3.2 \times 10^7$ | 29.5% | $8.1 \times 10^6$ | 7.4% |
|  | 10% | $1.1 \times 10^8$ | $3.1 \times 10^7$ | 28.9% | $5.0 \times 10^6$ | 4.6% |
| ATCC 15707 | 0% | $3.7 \times 10^7$ | $1.5 \times 10^6$ | 4.1% | Not detected | — |
|  | 1% | $4.1 \times 10^7$ | $2.6 \times 10^6$ | 6.3% | $5.5 \times 10^5$ | 1.3% |
|  | 2% | $2.9 \times 10^7$ | $6.1 \times 10^6$ | 21.0% | $3.1 \times 10^6$ | 10.7% |
|  | 3% | $2.4 \times 10^7$ | $8.6 \times 10^6$ | 35.8% | $3.4 \times 10^6$ | 14.2% |
|  | 4% | $3.6 \times 10^7$ | $1.2 \times 10^7$ | 34.2% | $4.2 \times 10^6$ | 11.6% |
|  | 5% | $2.8 \times 10^7$ | $1.2 \times 10^7$ | 42.5% | $3.0 \times 10^6$ | 10.7% |
|  | 10% | $3.3 \times 10^7$ | $1.1 \times 10^7$ | 33.9% | $1.6 \times 10^6$ | 4.8% |

From the results in Table 2 it is evident that in those test solutions using the *Bifidobacterium longum* strain ATCC BAA-999 and containing 1 to 10% of added inulin, the bacterial count was maintained at not less than 1,000,000 per 1 ml even after storage for two weeks, which represents a significant improvement in the survival properties compared with the solution containing no added inulin, which was only capable of retaining a bacterial count of 50,000 per 1 ml.

Further, in those test solutions using the *Bifidobacterium longum* strain ATCC 15707 and containing 1 to 10% of added inulin, the bacterial count was maintained at not less than 500,000 per 1 ml even after storage for two weeks, which represents a significant improvement in the survival proper-

TABLE 3

| Dietary fiber | pH | Immediately after preparation Live bacterial count (/ml) | After one week Live bacterial count (/ml) | Survival rate | After two weeks Live bacterial count (/ml) | Survival rate |
|---|---|---|---|---|---|---|
| None added | 4.8 | $8.50 \times 10^7$ | $2.30 \times 10^7$ | 27% | $3.00 \times 10^6$ | 3.5% |
| | 4.5 | $1.02 \times 10^8$ | $1.30 \times 10^6$ | 1% | $1.30 \times 10^5$ | 0.1% |
| | 4.1 | $8.70 \times 10^7$ | Not detected | — | Not detected | — |
| Inulin | 4.8 | $9.4 \times 10^7$ | $6.10 \times 10^7$ | 65% | $6.70 \times 10^7$ | 71.3% |
| | 4.5 | $1.80 \times 10^8$ | $7.00 \times 10^7$ | 39% | $1.70 \times 10^7$ | 9.4% |
| | 4.1 | $1.11 \times 10^8$ | $2.26 \times 10^7$ | 20% | $5.00 \times 10^6$ | 4.5% |

As is evident from Table 3, the test solutions containing 3% of added inulin exhibited improved survival of the bifidobacteria compared with the solution containing no added inulin at any of the pH levels between 4.1 and 4.8. A survival rate of not less than 5% was achieved at a pH of 4.5 to 4.8, which represents a particularly marked effect.

Example 1

(Culture Preparation)

1,000 ml of a medium composed of a yeast extract 0.2% (w/w) and non-fat milk powder 11% (w/w) that had been subjected to sterilization at 90° C. for 30 minutes was inoculated with 100 ml of a seed culture of the *Bifidobacterium longum* strain ATCC BAA-999, and the mixture was incubated for 6 hours at 37° C., thus yielding a culture of the *Bifidobacterium longum* strain ATCC BAA-999.

Meanwhile, 1,500 ml of a medium composed of a yeast extract 0.1% (w/w) and a reconstituted non-fat milk medium 10% (w/w) that had been subjected to sterilization at 90° C. for 30 minutes was inoculated with 50 ml of a seed culture of the *Streptococcus thermophilus* strain ATCC19258, and the mixture was incubated for 5 hours at 37° C., thus yielding a culture of the *Streptococcus thermophilus* strain ATCC19258.

(Preparation of Sterilized Base)

30 kg of a liquid milk preparation composed of non-fat milk powder 3.1% (w/w), sugar 8.0% (w/w), inulin 3% (w/w), CMC 0.4% (w/w), citric acid (in sufficient amount to regulate the pH to 4.6) and flavor 0.1% (w/w), with the remainder being water, was emulsified and then subjected to heat sterilization, thus completing preparation of a sterilized base [milk fat: 0.1% (w/w), non-fat milk solid content: 2.9% (w/w)].

Specifically, the non-fat milk powder (manufactured by Morinaga Milk Industry Co., Ltd.), the sugar (manufactured by Mitsui Sugar Co., Ltd.), the inulin, and the CMC (manufactured by Dai-ichi Kogyo Seiyaku Co., Ltd.) were mixed and dissolved in the water. Following mixing, the citric acid (manufactured by San-Ei Gen F.F.I. Inc.) was added to adjust the pH to 4.6, and finally the flavor was added to complete production of the liquid milk preparation. The thus obtained liquid milk preparation was then emulsified by conducting a homogenization treatment at 15 MPa.

Subsequently, heat sterilization was performed. The heat sterilization was conducted under sterilization conditions that involved holding the preparation at 130° C. for 2 seconds using a plate-type sterilizer (manufactured by Morinaga Engineering Co., Ltd.). Following the heat sterilization, the temperature of the liquid was cooled to 10° C., yielding a sterilized base.

(Preparation of Lactic Acid Bacteria Beverage)

To the prepared sterilized base were added a sufficient amount of the culture of the *Bifidobacterium longum* strain ATCC BAA-999 prepared in the manner described above to achieve a bacterial count following addition of approximately $1 \times 10^8$/ml, and a sufficient amount of the above culture of the *Streptococcus thermophilus* strain ATCC19258 culture to achieve a bacterial count following addition of approximately $2 \times 10^6$/ml.

The resulting mixture was used to fill a plastic container with a capacity of 120 ml, and the container was then sealed, yielding a lactic acid bacteria beverage of example 1. The bifidobacteria count following storage of this lactic acid bacteria beverage for 14 days at 10° C. was $3.5 \times 10^7$/ml, which represents a survival rate of approximately 35%.

Example 2

Culture Preparation 1,000 ml of a medium composed of a yeast extract 0.2% (w/w) and non-fat milk powder 11% (w/w) that had been subjected to sterilization at 90° C. for 30 minutes was inoculated with 100 ml of a seed culture of the *Bifidobacterium longum* strain ATCC15707, and the mixture was incubated for 6 hours at 37° C., thus yielding a culture of the *Bifidobacterium longum* strain ATCC15707.

Meanwhile, 1,500 ml of a medium composed of a yeast extract 0.1% (w/w) and a reconstituted non-fat milk medium 10% (w/w) that had been subjected to sterilization at 90° C. for 30 minutes was inoculated with 50 ml of a seed culture of the *Streptococcus thermophilus* strain ATCC19258, and the mixture was incubated for 5 hours at 37° C., thus yielding a culture of the *Streptococcus thermophilus* strain ATCC19258.

(Preparation of Sterilized Base)

30 kg of a liquid milk preparation composed of non-fat milk powder 3.1% (w/w), sucralose 0.01% (w/w), inulin 3% (w/w), CMC 0.4% (w/w), citric acid (in sufficient amount to regulate the pH to 4.6) and flavor 0.1% (w/w), with the remainder being water, was emulsified and then subjected to heat sterilization, thus completing preparation of a sterilized base [milk fat: 0.1% (w/w), non-fat milk solid content: 2.9% (w/w)].

Specifically, the non-fat milk powder (manufactured by Morinaga Milk Industry Co., Ltd.), the sucralose (manufactured by San-Ei Gen F.F.I. Inc.), the inulin, and the CMC (manufactured by Dai-ichi Kogyo Seiyaku Co., Ltd.) were mixed and dissolved in the water. Following mixing, the citric acid (manufactured by San-Ei Gen F.F.I. Inc.) was added to adjust the pH to 4.6, and finally the flavor was added to complete production of the liquid milk preparation. The thus obtained liquid milk preparation was then emulsified by conducting a homogenization treatment at 15 MPa.

Subsequently, heat sterilization was performed. The heat sterilization was conducted under sterilization conditions that involved holding the preparation at 130° C. for 2 seconds using a plate-type sterilizer (manufactured by Morinaga Engineering Co., Ltd.). Following the heat sterilization, the temperature of the liquid was cooled to 10° C., yielding a sterilized base.

(Preparation of Lactic Acid Bacteria Beverage)

To the prepared sterilized base were added a sufficient amount of the culture of the *Bifidobacterium longum* strain ATCC 15707 prepared in the manner described above to achieve a bacterial count following addition of approximately $1 \times 10^8$/ml, and a sufficient amount of the above culture of the *Streptococcus thermophilus* strain ATCC19258 to achieve a bacterial count following addition of approximately $2 \times 10^6$/ml.

The resulting mixture was used to fill a plastic container with a capacity of 120 ml, and the container was then sealed, yielding a lactic acid bacteria beverage of example 2. The bifidobacteria count following storage of this lactic acid bacteria beverage for 14 days at 10° C. was $2.5 \times 10^7$/ml, which represents a survival rate of approximately 25%.

INDUSTRIAL APPLICABILITY

The acidic lactic acid bacteria beverage of the present invention has a favorable flavor and an improved survival rate for bifidobacteria. Further, the method of producing an acidic lactic acid bacteria beverage of the present invention enables the production of an acidic lactic acid bacteria beverage having a favorable flavor and an improved survival rate for bifidobacteria.

What is claimed is:

1. A method of producing an acidic lactic acid bacteria beverage, comprising:
    preparing a sterilized base by emulsifying and sterilizing a base which comprises a raw milk and inulin,
    cooling said sterilized base to 10° C.,
    preparing a culture containing *Bifidobacterium longum* by inoculating with a *Bifidobacterium longum* to a medium,
    adding said culture of *Bifidobacterium longum* to said cooled sterilized base to produce an acidic lactic acid bacteria beverage,
    storing said acidic lactic acid bacteria beverage at a temperature not higher than 10° C., wherein
    said inulin contained in the sterilized base is not fermented by *Bifidobacterium longum*.

2. The method according to claim 1, wherein an amount of said inulin is within a range of from 1% to 10% by mass of said acidic lactic acid bacteria beverage.

3. The method according to claim 1 or claim 2, wherein the pH of said acidic lactic acid bacteria beverage is within a range of from 4.1 to 4.8.

* * * * *